United States Patent
Lucas et al.

[11] Patent Number: 6,108,963
[45] Date of Patent: Aug. 29, 2000

[54] ELECTROMECHANICAL SOUND GENERATOR FOR A FISHING LURE

[75] Inventors: Michael Lucas, Cupertino; Thomas J. Barron, Paso Robles, both of Calif.

[73] Assignee: SoundBite Corporation, Reno, Nev.

[21] Appl. No.: 09/029,296

[22] PCT Filed: Sep. 5, 1996

[86] PCT No.: PCT/US96/14168

§ 371 Date: May 29, 1998

§ 102(e) Date: May 29, 1998

[87] PCT Pub. No.: WO97/08948

PCT Pub. Date: Mar. 13, 1997

Related U.S. Application Data

[60] Provisional application No. 60/003,217, Sep. 5, 1995.

[51] Int. Cl.[7] .................................................. A01K 85/01
[52] U.S. Cl. ............................................ 43/42.31; 43/26.2
[58] Field of Search .................................. 43/42.31, 26.2; 367/148; 340/384, 390.2; 116/22 A

[56] References Cited

U.S. PATENT DOCUMENTS

| | | | |
|---|---|---|---|
| 2,577,229 | 12/1951 | Carnes | 340/393.2 |
| 2,757,475 | 8/1956 | Pankove | 43/17.1 |
| 2,784,399 | 3/1957 | Smith | 340/388.7 |
| 4,223,467 | 9/1980 | Hodgese, Jr. et al. | 43/42.31 |
| 4,380,132 | 4/1983 | Atkinson | 43/26.2 |
| 4,805,339 | 2/1989 | Fuentes et al. | 43/42.31 |
| 4,960,437 | 10/1990 | Watson et al. | 43/42.31 |
| 5,485,697 | 1/1996 | Watson et al. | 43/42.31 |
| 5,497,581 | 3/1996 | Williams | 43/42.31 |
| 5,697,182 | 12/1997 | Rodgers | 43/17.1 |

*Primary Examiner*—Michael J. Carone
*Assistant Examiner*—Son T. Nguyen
*Attorney, Agent, or Firm*—Trask, Britt & Rossa

[57] ABSTRACT

A device which functions to influence, either by attracting or repelling marine life includes a mechanism structured and arranged to shuttle a slug, i.e. an iron ball or other element having magnetic properties, between first and second positions in a manner which creates sound audible to marine life, such as fish, which it is desired to attract or repel. In one embodiment, an iron ball is shuttled between an electromagnet and a permanent magnet attached to an acoustic amplification plate.

28 Claims, 6 Drawing Sheets

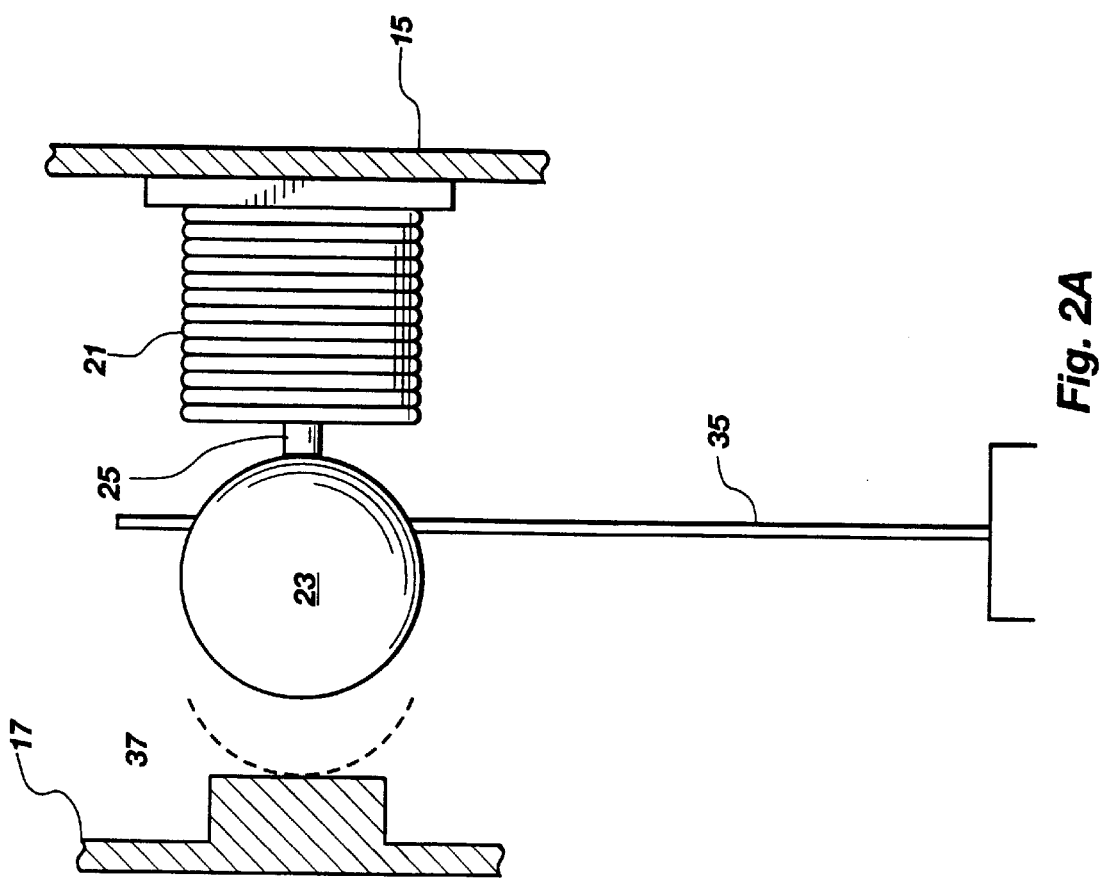

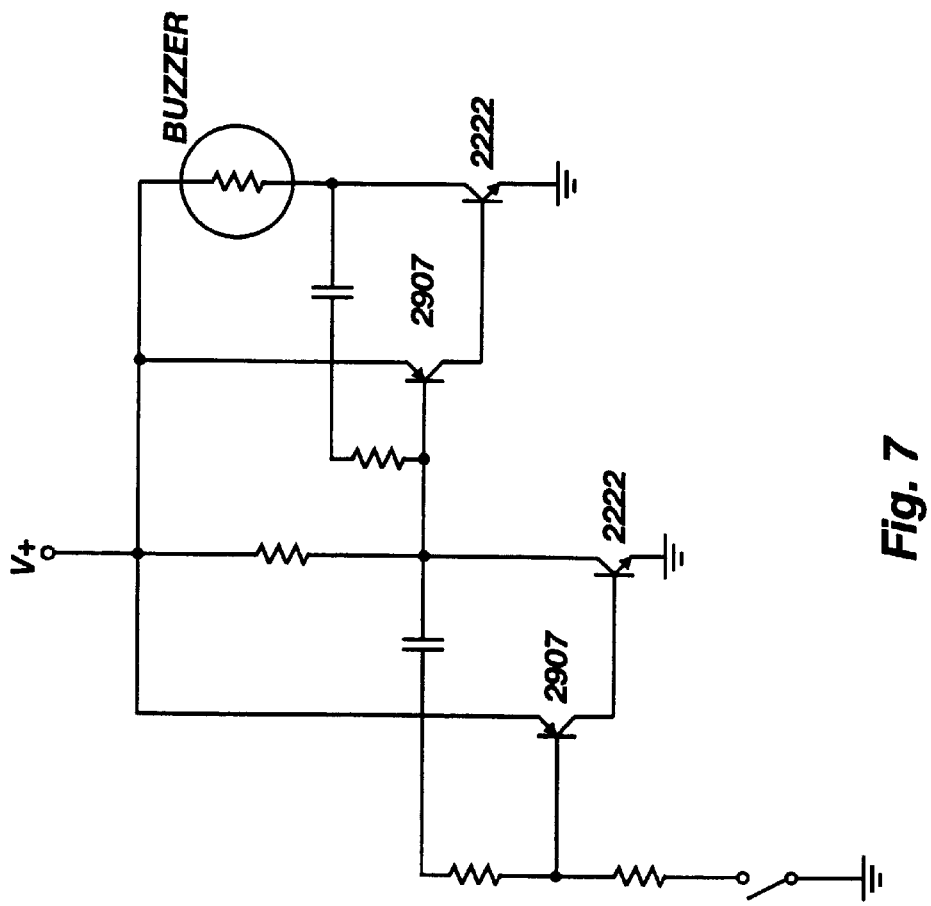
*Fig. 7*
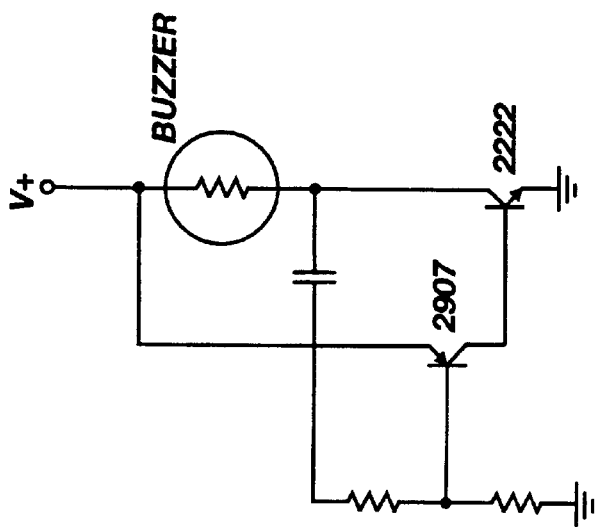
*Fig. 6*
TO CIRCUIT
A
B
*Fig. 8*

ELECTROMECHANICAL SOUND GENERATOR FOR A FISHING LURE

RELATED APPLICATIONS

This application claims priority of PCT/US96/14168, filed Sep. 5, 1996, based upon Ser. No. 60/003,217 filed Sep. 5, 1995.

TECHNICAL FIELD

This invention relates to sound-generating fish- attracting or repelling, electronic devices. It is particularly directed to sound generators for such devices, and provides a versatile, electromagnetic sound generator.

BACKGROUND ART

It is presently understood that fish typically have a type of inner ear which can hear or sense sound transmitted through the water. It is further understood that fish have lateral line sensing organs which also sense sound. Such lateral line perception is apparently effective for lower frequencies, somewhere between about 4 hertz and 200 hertz. Inner ear sound sensing by fish is believed to be effective for frequencies in the range of between about 2 hertz to about 1000 hertz.

Lateral line sensing is apparently relied upon by fish to establish the relative origin of the sound by direction and depth and possibly even range. Specific sounds may be representative of a minnow and/or other aquatic creature which could be viewed by the fish as food. The In-Fisherman, Book #85, April '89, page 42–53. Fish are also believed to be responsive to magnetic and various other EMF fields.

A wide variety of fishing lures include mechanical or electronic means for attracting fish. For example, U.S. Pat. No. 4,223,467 (Hodges, Jr. et al.) discloses a fishing lure which intermittently buzzes and vibrates upon a change in attitude. U.S. Pat. No. 4,380,132 (Atkinson) discloses a plug with a water tight cavity within which a transducer transmits sound energy into the water. U.S. Pat. No. 2,757,475 (Pankove) discloses an early example of an electrically powered oscillator contained within a fishing lure, the power being generated by the action of water on dissimilar metal electrodes. U.S. Pat. No. 3,310,902 (Godby) discloses a fishing lure containing electrical components which generate a buzzing sound. U.S. Pat. No. 4,805,339 (Fuentes et al.) is directed to an electronically powered transducer fluid coupled to the water to transmit acoustic signals into the water in selected patterns. U.S. Pat. No. 4,583,313 (Dugan, Jr.) also shows a fishing lure housing circuitry to generate signals in a predetermined frequency band. U.S. Pat. Nos. 4,960,437 (Watson, et al) and 5,237,771 (Watson, et al) disclose signal generators of various types which may be associated in various ways with fishing lures. For example, they may be incorporated in a lure or they may be embodied as modules comprising a part of a plug, jig, bait rigging, or other lure.

Electronic lures are generally battery powered. They must thus be constructed either in disposable form, or to accommodate a replaceable battery. They must also accommodate associated electronic circuitry and switch mechanisms. Extending battery life has represented a technical challenge, as has the provision of reliable switching and miniaturization generally. It has only recently been practical to provide the advantages of electronic lures in miniature lure devices or in certain popular rigging arrangements, notably a Carolina rig.

Small operational signal-generating devices which can be associated with a lure, bait, spinner or jig structure to impart vibrational, acoustic or EMF energy to the water have been proposed. Such devices may be constructed to be readily added or subtracted to an overall fishing arrangement. It may also be configured to be either stationary or moveable, at the option of the fisherman. Such a device may transmit signals characteristic of currently preferred electronic lures; i.e., preselected in a pattern suggestive of food to fish as well as to provide signals for lateral line sensing by the fish. Ideally, the power supply, sound-generating and switching components of the device may be sufficiently compact and functional to improve the versatility of the practical applications of fish-attracting and/or fish-repelling electronic technology.

DISCLOSURE OF INVENTION

The present invention is directed to a noise making device which may be incorporated into any of the fishing lures disclosed by the applications incorporated by reference and the patents identified as representing the state of the art. Alternatively, it may be separately embodied in similar lures structured as a "rattle bait" or the like.

According to this invention, a mechanism is structured and arranged to shuttle a slug (e.g, an iron ball or other element having magnetic properties) between first and second positions in a manner which creates sound audible to marine life (typically fish) which it is desired to attract or repel. A typical embodiment relies upon energizing an electromagnet to attract the slug to a first position. When the electromagnet is de-energized, the slug is impelled by gravity, a second magnet (either electro or permanent), a spring or other biasing means to a second position. Noise is created by movement of the slug across or against noise emitting structures, typically stop plates at the first and/or second positions.

The structural components of the device (e.g. fishing lure) may be selected to achieve a variety of desired sound effects. For example, the number of slugs used, their size and arrangement (including a combination of different sizes and shapes of slugs manipulated in concert). the size, thickness, and selection of materials and the shape and damping properties of the struck components will produce different sound frequencies and combination of frequencies. The moving slug need not be a ball. It can be any shape that suits space or design.

In applying this type of noise maker into a fishing device, it is an important objective to generate noise with as little power as possible. The following factors are important within this context:

1. The distance that the ball is required to move, between the stop at one extreme of the travel (typically an electromagnet) and the stop at the opposite extreme of the travel (typically a permanent magnet) should be minimized.

2. The batteries should be as large as practical for the application, consistent with appropriate voltage and current capacity considerations.

3. The resistance of the electromagnetic coil should be optimized for low current consumption verses performance.

4. The magnetic field paths should be optimized for the lowest practical amount of resistance.

5. The electromagnet "pulse on" time should be kept to its minimum practical duration.

6. Large surfaces are preferred as sound amplifier elements.

A device or system of this invention may include one or more replacement containers constructed and arranged to be interchangeable with the first, or pulse train, container. A plurality of such replacement containers may each carry a pulse train source constructed and arranged to provide a pulse train different from pulse trains provided by the pulse train sources carried by the other replacement containers. A power source, such as a miniature battery may be permanently or interchangeably included within each replacement container.

A device or system of this invention may also or alternatively include one or more replacement transducer containers constructed and arranged to be interchangeable with the second, or transducer-containing, container. A plurality of such replacement transducer containers may each carry a transducer constructed and arranged to provide a fish-influencing effect different from the effects provided by transducers carried by the other replacement transducer containers.

Either one of the first and second containers may be configured as a morsel. Alternatively, an integrated structure including both of the containers may be configured as a morsel. A morsel may comprise a crank bait, a jig bait, or simulate a natural fish food, such as small creature. Certain preferred morsels comprise resilient imitation creatures, such as frogs, tadpoles, insects, larvae or worms. A simulated natural fish food morsel may be constructed to possess selected balance and buoyancy properties. The morsel or some other portion of the lure may be structured and arranged to emit odors or taste-stimulating substances.

BRIEF DESCRIPTION OF DRAWINGS

In the drawings, which illustrate what is currently regarded as the best mode for carrying out the invention, FIGS. 1, 2A, 2B and 3 illustrate various noise making "buzzer" devices of the invention; and FIGS. 4–7 illustrate various circuit arrangements incorporating a buzzer device, such as any of those illustrated by FIGS. 1–3.

FIG. 8 illustrates a water switch.

BEST MODE FOR CARRYING OUT THE INVENTION

Figure 1:
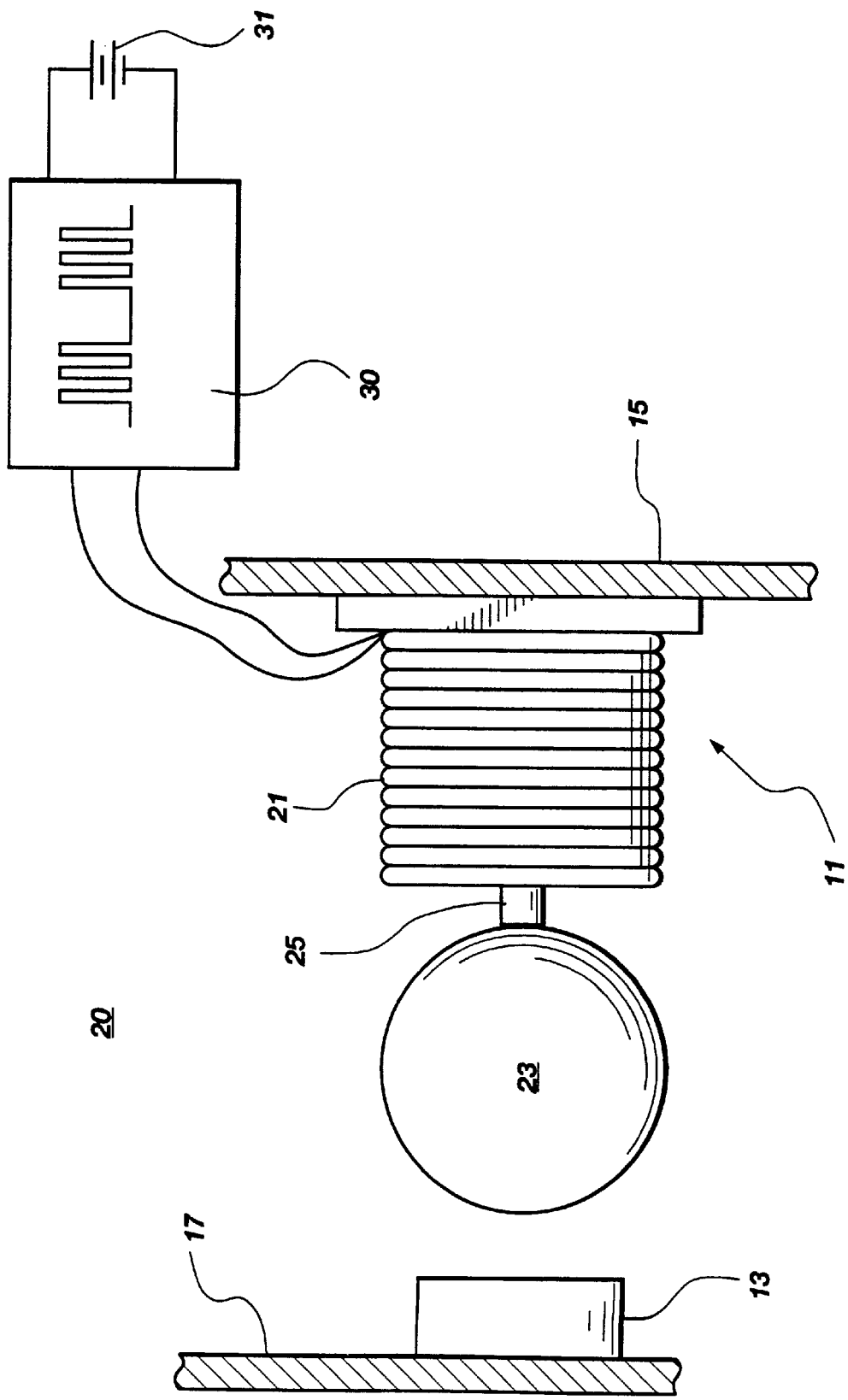

FIG. 1 illustrates a buzzer arrangement with a permanent magnet ball return including an electromagnet coil 11 with an iron core, a permanent magnet 13 and acoustic amplifier plate 15 and plate 17 at respective first and second locations within a housing 20. In operation, when the power is applied to the electromagnetic coil 21, the steel ball 23 is attracted to the electromagnet 11. A sound is generated as the ball 23 strikes the core 25. The ball 23 is attracted towards the permanent magnet 13, when power to the electromagnet 11 is turned off. A second sound is generated when the ball 23 strikes the magnet 13. As shown, the permanent magnet 13 and the iron core 25 of the electromagnet 11 are attached to plates 15, 17 fashioned as acoustic amplification panels, which may comprise the sides of a plastic fishing lure. As the iron ball 23 shuttles back and forth, the sound of the ball 23 striking against the electromagnet core 25 and the permanent magnet 13 is amplified to an audible level. The plates 15 and 17 may be identical or differ in acoustical properties, and other structures or sound-generating devices may be substituted for either or both plates 15, 17.

The shuttling frequency of the iron ball 23 is controllable through associated circuitry (FIGS. 4–7). As shown by FIG. 1, the frequency of the buzzer device may, for example, correspond to a train of variably spaced pulses (e.g. 10 milliseconds wide) from a pulse train (wave form) generator 30 powered by a battery 31. A pulse train source 30 and buzzer arrangement may be housed within a container 32 which may comprise the body of a fishing lure.

Figure 2B:
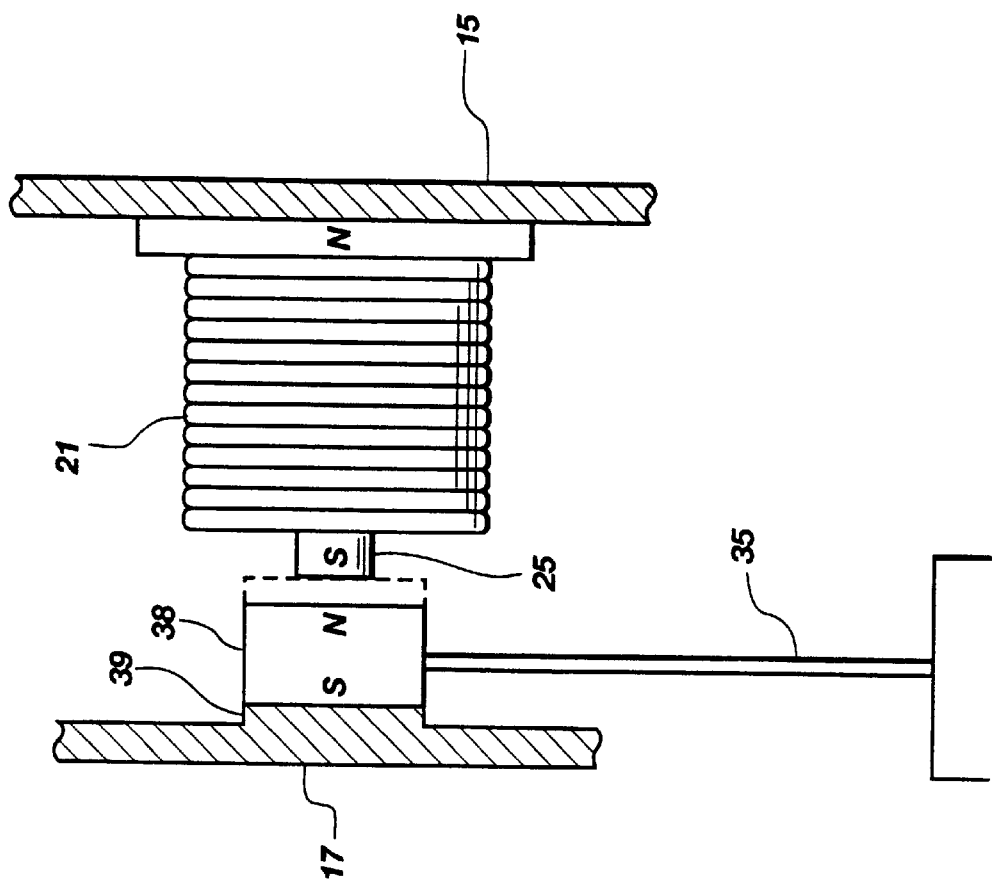

The drawings illustrate various expedients for moving the ball 23 away from the de-energized electromagnet 11 to provide for travel of the ball 23 back towards the core 25 when it is re-energized. FIG. 2A illustrates a typical flexure spring ball return embodiment, with a flexure spring 35 urging the ball 23 away from the core 25 towards a stop 37 mounted to the plate 17. FIG. 2A illustrates the steel ball 23 in an electromagnetic energized position. FIG. 2B illustrates an alternative embodiment in which the spring 35 carries a slug 38 formed from a permanent magnet. Spring 35 biases the magnetic slug 38 against a magnet stop 39 associated with an acoustic plate 17. As illustrated, the acoustic plates 15, 17 cooperatively define a cavity internal a fishing lure. Energizing the electromagnet 11 with the indicated polarity will attract the magnet (permanent) to the electromagnet. De-energizing the electromagnet allows the spring 35 to return the permanent magnet slug 38 to the magnet stop position.

Figure 3:
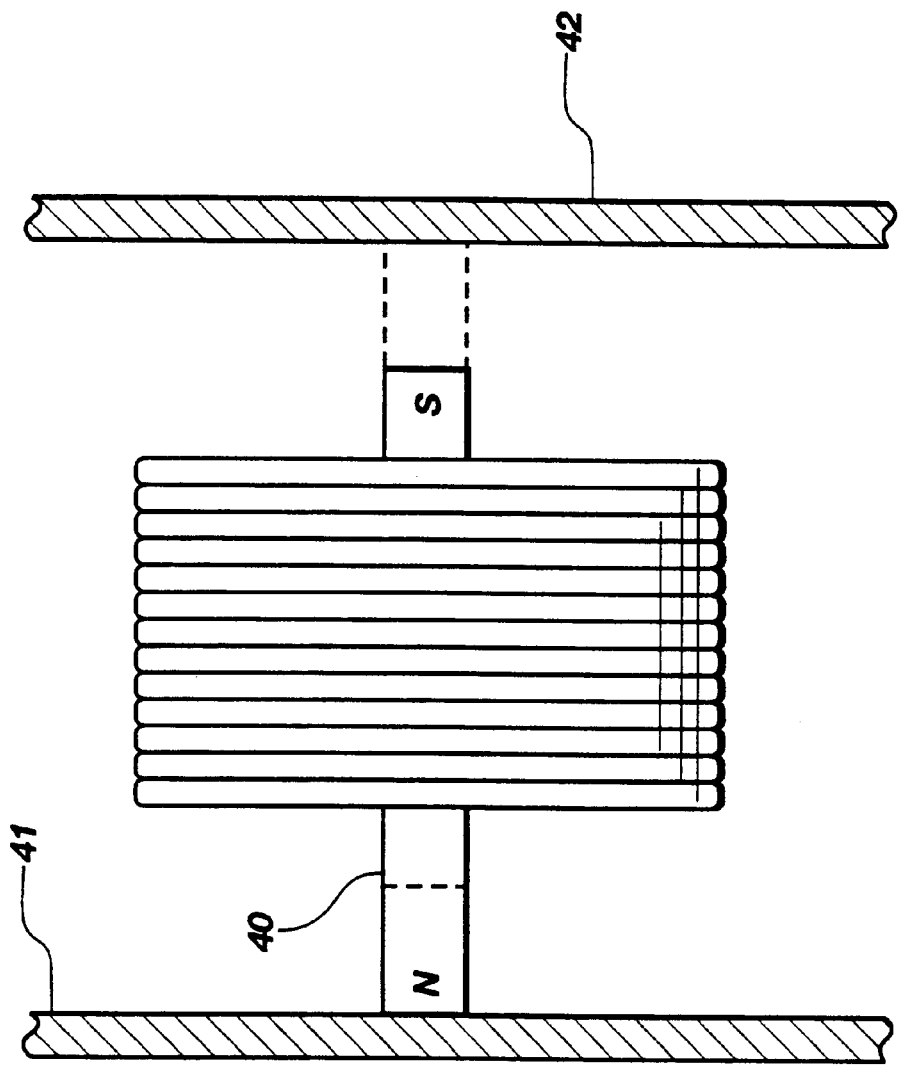

An alternative embodiment is illustrated by FIG. 3. As illustrated, an electro magnet 40 is mounted to shuttle between two acoustic plates 41, 42. A permanent bar magnet may be substituted for the electro magnet 40 as the slug, in which case, the slug is shuttled back and forth within an electromagnetic field between the acoustic plates 41, 42. As the bar magnet is shuttled back and forth, striking stops at either end of its travel, the striking of the stops creates a variety of sounds based upon the pulse train fed to the electromagnet. The acoustic plates 41, 42 form sides for the lure.

Alternate embodiments within contemplation include: An electromagnet structured with striker elements (slugs), such as balls, carried at opposite ends of its electromagnetic core for manipulated movement induced by a fluctuating field; Multiple electromagnets in an arrangement whereby each may be independently driven to manipulate one or more slugs; Two electromagnets may be arranged to shuttle one or more slugs back and forth between them; The electromagnetic force field may be directed such that it causes a canceling affect such that the slug may be drawn to the electromagnet (e.g., away from the permanent magnet) with a minimum of pulling force from the electromagnet.

The practical circuits illustrated by FIGS. 4–7 are capable of delivering pulse trains of electrical power which effect sounds from a device, notably a fishing lure, in which they are embodied. These sounds may range from spaced "clicks" or "knocks" to "chattering" or "buzzing," among a great variety of other sounds. The pitch, duration and pattern of the sounds emitted may be predesigned or adjustable to meet the circumstances encountered or likely to be encountered in the field. These circuits may further be modified in various ways to incorporate light emitting devices, such as LEDs, and water switches of the type disclosed, for example, in the applications incorporated by reference. They may further be associated with fish-attracting or repelling devices which emit chemical attractants or repellents, of a general or species-specific nature.

Figure 5:
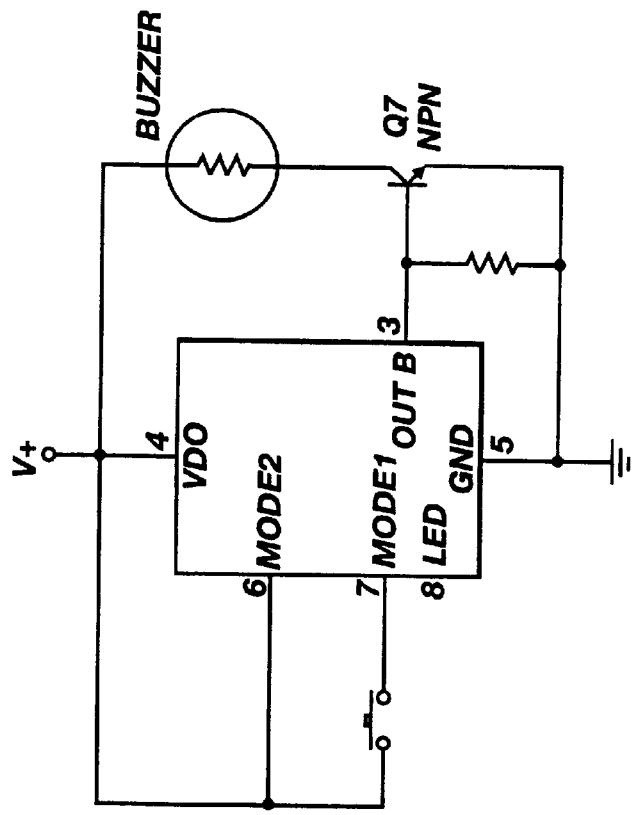
Figure 4:
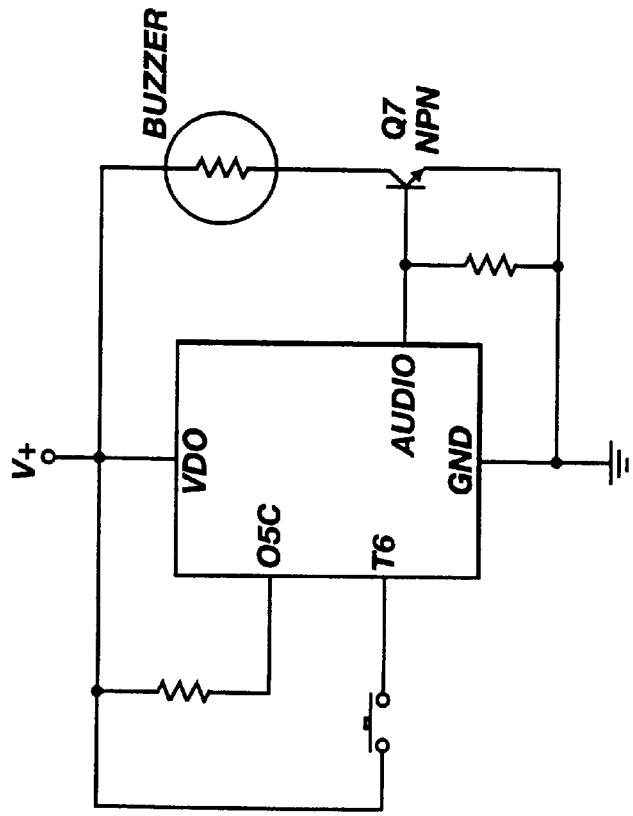

FIG. 4 illustrates a voice chip implementation with an LED being optional. The illustrated switch may be replaced with a water switch. FIG. 5 depicts a pulse train generator with optional LED driver. The switch illustrated in FIG. 5 may be replaced by a water switch. FIG. 6 shows a one stage oscillator wherein repetitive click sounds can also be adapted to flash an LED. FIG. 7 illustrates a two-stage oscillator wherein repetitive click sounds in bursts can also flash an LED. In this embodiment the switch illustrated in the lower left hand corner of the drawing may be replaced with a water switch.

FIG. 8 illustrates a water switch. When the switch is placed in water, a complete circuit will exist between A and B.

Reference in this disclosure to details of specific embodiments is not intended to limit the scope of the appended claims, which themselves define the invention.

What is claimed is:

1. In a system of the type in which a pulse train source is connected in circuit with a transducer to emit signals of predetermined properties audible to marine life, the improvement which comprises:
   a transducer, including
      housing structure containing first and second stop elements and a slug, having magnetic properties, positioned between said first and second stop elements, all structured and arranged to permit said slug to shuttle in a controlled and repeatable manner between said first and second stop elements, whereby to create sound audible to marine life; and
      electronic drive means operably associated with said housing structure to provide a fluctuating magnetic field effective to urge said slug between said first and second stop elements.

2. An improvement according to claim 1, wherein said system is embodied as a fishing lure, and said transducer operates to emit noise signals in a predetermined pattern.

3. An improvement according to claim 2, wherein said noise is perceived by the human ear as one or more clicks, knocks, rattles, chattering, buzzing or similar sounds.

4. In a system having a pulse train source connected in circuit with a transducer to emit signals of predetermined properties audible to marine life, the improvement which comprises said transducer being structured as a mechanism arranged to shuttle a slug having magnetic properties in a controlled and repeatable manner between first and second positions comprising first and second stop elements, whereby to create sound audible to marine life.

5. An improvement according to claim 4, wherein said transducer includes an electromagnet connected in operable association with said pulse train source to be first energized to attract said slug to said first position and to be then de-energized, said transducer further including means for impelling said slug to said second position when said electromagnet is de-energized.

6. An improvement according to claim 5, wherein noise is created by movement of said slug in contact with noise-emitting structure positioned in the vicinity of at least one of said first and second positions.

7. An improvement according to claim 6, wherein said mechanism is embodied as a fishing lure, and operates to emit noise signals in a predetermined pattern.

8. An improvement according to claim 7, wherein said noise is perceived by the human ear as one or more clicks, knocks, rattles, chattering, buzzing or similar sounds.

9. An improvement according to claim 4, wherein said mechanism is structured and arranged such that said slug is impelled by a biasing means selected from gravity, magnetic field, mechanical spring means or equivalent means to said second position.

10. A fishing lure comprising:
    a pulse train generator;
    a transducer constructed and arranged to produce fish-attracting sounds in response to pulses emitted by said pulse train generator;
    means for integrating said pulse train generator and said transducer into said lure; and
    means for connecting an electronic output from said pulse train generator in driving relation with said transducer;
    wherein said transducer includes a slug with magnetic properties positioned to move in a controlled and repeatable manner between first and second stop elements within a fluctuating magnetic field driven by said pulse train generator.

11. An improvement according to claim 10, wherein noise is created by movement of said slug in contact with noise-emitting structure comprising at least one of said first and second stop elements.

12. An improvement according to claim 11, wherein said fishing lure operates to emit noise signals in a predetermined pattern.

13. An improvement according to claim 12, wherein said noise is perceived by the human ear as one or more clicks, knocks, rattles, chattering, buzzing or similar sounds.

14. An improvement according to claim 10, wherein said transducer includes an electromagnet connected in operable association with said pulse train source to be first energized to attract said slug to contact said first stop element and to be then de-energized, said transducer further including means for impelling said slug to contact said second stop element when said electromagnet is de-energized.

15. An improvement according to claim 14, wherein said transducer is structured and arranged such that said slug is impelled by a biasing means selected from gravity, magnetic field, mechanical spring means or equivalent means to said second position.

16. A fishing lure according to claim 10, wherein said pulse train generator is mounted within a first container and said first container is removably installed in said lure.

17. A fishing lure according to claim 16, including a replacement container constructed and arranged to be interchangeable in said lure with said first container.

18. A fishing lure according to claim 17, including a plurality of said replacement containers, each said replacement container carrying a pulse train generator constructed and arranged to provide a pulse train different from pulse trains provided by said pulse train generators carried by other of said replacement containers.

19. A fishing lure according to claim 16, wherein said pulse train generator includes a power source mounted within said first container.

20. A fishing lure according to claim 19, wherein said power source includes a miniature battery.

21. A fishing lure according to claim 20 wherein said battery is removably installed in said first container.

22. A fishing lure according to claim 21, wherein said transducer is mounted in a second container, and said second container is removable installed in said lure.

23. A fishing lure according to claim 22, including a replacement transducer container constructed and arranged to be interchangeable with said second container.

24. A fishing lure according to claim 23, including a plurality of said replacement transducer containers, each said replacement transducer container carrying a transducer constructed and arranged to provide a fish-attracting sound pattern different from the sound pattern provided by said transducers carried by other of said replacement transducer containers.

25. A fishing lure according to claim 10, wherein said lure is configured as a morsel.

26. A fishing lure according to claim 25, wherein said morsel comprises a crank bait.

27. A fishing lure according to claim 25, wherein said morsel comprises a jig bait.

28. A fishing lure according to claim 25, wherein said morsel comprises a resilient imitation creature.

* * * * *